United States Patent
Cavanagh

(10) Patent No.: US 6,216,599 B1
(45) Date of Patent: Apr. 17, 2001

(54) GROUND EFFECT TRANSPORT SYSTEM

(75) Inventor: Richard A. Cavanagh, Panama City, FL (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/325,791

(22) Filed: Jun. 4, 1999

(51) Int. Cl.[7] ....................................... B60V 3/04
(52) U.S. Cl. ..................... 104/23.2; 180/116; 180/118; 180/119; 180/127
(58) Field of Search ................. 104/23.2, 118, 104/134, 23.1; 180/116, 119, 127, 118

(56) References Cited

U.S. PATENT DOCUMENTS

| | | | |
|---|---|---|---|
| 3,675,582 | * 7/1972 | Girard et al. | 104/23.2 |
| 3,777,667 | * 12/1973 | Perrott | 104/88.01 |
| 3,845,716 | * 11/1974 | Bertelsen | 104/23.2 |
| 3,917,022 | * 11/1975 | Brooks, Jr. | 180/127 |
| 4,063,611 | * 12/1977 | Anderson | 118/119 |
| 4,175,636 | * 11/1979 | Broughton | 180/119 |
| 4,397,366 | * 8/1983 | Eldridge et al. | 180/116 |
| 4,516,651 | * 5/1985 | Duchateau | 180/127 |
| 4,813,508 | * 3/1989 | Hansen | 180/118 |
| 4,821,647 | * 4/1989 | Powell et al. | 104/23.2 |

* cited by examiner

Primary Examiner—S. Joseph Morano
Assistant Examiner—Lars A. Olson
(74) Attorney, Agent, or Firm—Harvey A. Gilbert; Donald G. Peck

(57) ABSTRACT

A transportation system has an air cushion vehicle in a U-shaped or W-shaped channel in the ground. The channel provides support and directional stability for the air cushion vehicle during transit along its length. This system assures high speed overland transport of heavy equipment which is faster than trains, and the system is cost effective since it does not incur expensive nonrecurring capital investments and expensive recurring maintenance costs. This transportation system is adaptable to existing overland right-of-ways.

4 Claims, 3 Drawing Sheets

GROUND EFFECT TRANSPORT SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to transport systems. More particularly, this invention is to a system using air cushion vehicles in channels.

Transportation of heavy and bulky loads such as materials, commodities, supplies, machinery, equipments, ordnance, etc. has been and still is a formidable task. Ships, barges, boats, and other water-borne vessels have successfully delivered these loads across open water, and canals and locks were developed to extend this capability and to circumvent land obstacles. However, an overland transport system that is high-speed, costs less, and better than trains is still needed.

To a degree, trains currently carry substantial loads, but many trains are slow. Train systems also require expensive nonrecurring capital investments and expensive recurring maintenance costs. In many existing networks of rail roadways, large real estate investments have been made, but maintenance costs are high to meet safety standards.

Monorail transportation systems could be created in the networks of roadways, but the costs of laying concrete and building supporting rail structures are significant. Magnetic-levitation of heavy loads also has been investigated, but this appears to be prohibitive since, like the monorails, large up-front capital investments and large recurring, maintenance costs are needed. Consequently, almost any known advanced technology heavy-lift transportation system requires a large investment and high maintenance costs.

Thus, in accordance with this inventive concept, a need has been recognized in the state of the art for systems capable of transporting heavy loads overland at high transit speeds and at reduced capital investment and maintenance costs for the roadway.

SUMMARY OF THE INVENTION

The present invention provides a transportation system that has an air cushion vehicle in a trench-like channel in the ground. The channel provides support and directional stability for the vehicle during transit.

An object of the invention is to provide a cost-effective transportation system.

Another object of the invention is to provide a rapid transportation system to reduce the cost of distribution of goods and equipments that lowers the life cycle cost of nearly all equipment.

Another object of the invention is to provide a less expensive overland transportation system utilizing existing right-of-ways.

Another object of the invention is to provide a high-speed heavy-lift system needing minimal preparation and maintenance for the roadway.

Another object of the invention is to provide a high-speed, heavy-lift vehicle which can utilize the right-of-ways currently owned by railroads at lower roadway installation and maintenance costs.

Another object of the invention is to provide standardized roadway shapes accommodating one or more ground effect vehicles to haul different loads of cargo.

Another object of the invention is to provide a heavy lift transportation system that can be constructed and operated without imposing a major environmental impact.

Another object of the invention is to provide systems utilizing U-shaped channels to guide and stabilize air cushion vehicles therein.

Another object of the invention is to provide systems utilizing W-shaped channels to guide and stabilize air cushion vehicles therein.

These and other objects of the invention will become more readily apparent from the ensuing specification when taken in conjunction with the appended claims.

DESCRIPTION OF THE PREFERRED EMBODIMENTS

Figure 1:
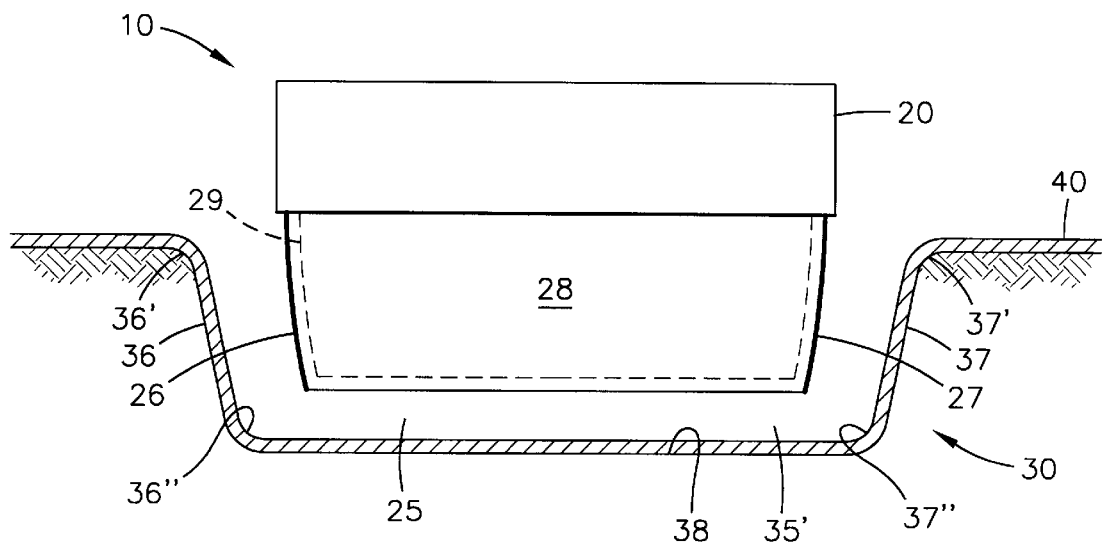
FIG. 1 is an end view of the transportation system of this invention having an air-cushion vehicle supported by an air cushion in a U-shaped roadway.

Referring to FIG. 1, transportation system 10 includes a ground-effect, or air-cushion vehicle 20 disposed to ride on cushion 25 of pressurized air on an appropriately-shaped roadway 30. System 10 fabricated according to this invention provides an expedient to rapidly transport heavy and bulky loads overland. It inherently requires fewer initial capital expenditures to build and less ongoing expenses to maintain than contemporary railroad lines. In fact, even greater cost effectiveness may be realized since system 10 may advantageously utilize existing overland right-of-ways, such as those held by many railroads. Furthermore, system 10 is more compatible with preserving the environment since roadway 30 could be dug across land and used for the needed period, and then the land could be relatively quickly restored to its previous condition without excessive costs.

Vehicle 20 rides on air cushion 25 in accordance with established principles of many well-known designs capable of lifting heavy loads and rapidly traversing expanses of water and land. Pressurized air for air cushion 25 is generated in and fed from appropriate equipment carried in vehicle 20. Elongate side skirts, or left and right side lateral panels 26 and 27 on opposite lateral sides of vehicle 20 extend the entire length of vehicle 20, and front and rear skirts, or panels 28 and 29 respectively reach across the width of the front and back of vehicle 20 and a portion of the width of channels to be described. Panels are thereby arranged around the periphery of vehicle 20 to contain and direct air cushion 25. Front and rear panels 28 and 29 may have segments tailored to conform to the outer surface of roadway 30, and all panels may be fabricated to have appropriate flexible, semi-flexible, or pliable properties to further assure generation and definition of air cushion 25.

Air cushion 25 lifts and supports heavy loads by distributing these loads across a wide area of vehicle 20, and air cushion 25 is supplied sufficient volumes of air within ranges of relatively low air pressure.

Typically, low air pressures in the range of about 0.5 pounds per square inch to 90.0 pounds per square inch at volumes in the range from about 5,000 cubic feet per second to 20,000 cubic feet per second are sufficient. Equipment onboard vehicle 20 generates and distributes satisfactory volumes of air at air pressures in these ranges to lift and support the total weight of vehicle 20 and its load. An exemplary vehicle 20 measuring 40 feet long by 8 feet wide may carry a load having a total weight of 80,000 pounds. The air pressure in air cushion 25 would have to be at least 1.74 pounds per square inch to support the total weight of this load. The onboard equipment may adjust the volume and pressure of air based on different total weights caused by different loads and differently sized vehicles. Larger vehicles may be used, and the size of a roadway can be larger to support greater total loads, or a number of vehicles 20 may be coupled together and be self powered or towed to increase the payload.

The required volumes and pressures of air to lift and support vehicle 20 can be developed by several different types of known onboard equipments. For examples, the wash of propeller fans, or the exhaust of a turbojet, turbofan, or similar engine can be used to generate the volumes and pressures of air in the air cushions. This can be augmented by scooping dynamic air as vehicle 20 moves forward, slowing it and converting dynamic pressure to static pressure for lift.

The same or auxiliary equipments including propeller fans, turbojets, turbofans, or similar engines also can be used to propel and brake vehicle 20 as currently done by known ground effect vehicles. Additionally, other forward propulsion equipments could be provided for vehicle 20, such as circular or tracked wheels, propellers, jets, etc. External towing or pushing systems similar to those used by barges on canals might be needed to aid the thrust of vehicle 20 so that it can climb steep inclines.

Since the total weight of the load and vehicle 20 is supported by volumes of pressurized air, the frictional component to be overcome by the propulsion system is low. For example, a few crew members can move by hand an air cushion vehicle weighing about 200,000 pounds. The rate of motion is not high, but this substantially sized air cushion vehicle is moved by this relatively small force. Thus, the forward propulsive force need not be excessive to achieve rapid transit speeds which may be in the neighborhood of about 2 or 3 miles per hour to 50 or more miles per hour, for example. In other words, other than the inertial mass of the total weight of the load and vehicle 20 that is accelerated to speed, the main force that the propulsion equipment has to counter is the gravitational component and the aerodynamic drag. Therefore, a relatively small portion of pressurized air of air cushion 25 may be vented through controllable openings provided in rear panel 29 at the back of vehicle 20. This vented pressurized air may be used to accelerate and maintain forward speed of vehicle 20 on roadway 30.

Support and directional guidance of vehicle 20 of transportation system 10 is provided by roadway 30. More particularly, directional stability is assured by the shape of a trench-like channel of roadway 30 which gives directional stability in much the same manner as do tails in airplanes and keels in ships. However, roadway 30 is unlike most roads and aircraft runways which are designed with a crown at their centers so water can roll off the sides and not collect or pool in the center.

If conventional air cushion vehicles, or ground effect machines were to operate over conventionally designed roads or runways, they would yaw and/or fall off to the side. This is because the frictional component between the vehicles and the roads is so small, and there is nothing to provide lateral stability. Consequently, air cushioned vehicles react strongly to gravitational forces that may destabilize them.

These gravitational forces are exhibited in two ways. One is lateral translation where the vehicles fall off to the side. The other is yaw where the vehicles can rotate about a vertical axis. Without some sort of directional restrictions, these two forces make control of air cushion vehicles very difficult.

Transportation system 10 provides support and directional control with roadway 30, rather than such control being inherent in vehicle 20. In this regard transportation system 10 is like a train that relies on rail structure for support and guidance. However, unlike the rail structure, roadway 30 is relatively quick and inexpensive to build and maintain.

By distinctly shaping roadway 30 in accordance with this invention, unwanted lateral and yaw deflections of vehicle 20 are prevented since possible side loads are supported. Roadway 30 can have a trench-like portion of the ground dug away to define U-shaped channel 35' that may continuously extend for many miles. U-shaped channel 35' has side surfaces 36 and 37 that can support side loads and base surface 38 that supports loads and resists ablation. The ground soil may be compacted or otherwise reinforced with aggregate and/or more scraped-up ground soil so that base surface 38 may support and resist ablation better and side surfaces 36 and 37 may bear the side loads created by air cushion 25 of vehicle 20.

U-shaped channel 35' of roadway 30 may be formed by conventional earth moving, digging, and trenching machinery to have lateral side surfaces 36 and 37 and base surface 38. The cross-sectional shape of channel 35' is scalloped so that upper corners 36' and 37' and lower corners 36" and 37" are rounded.

Barrier layer 40 is secured to and covers channel 35' including side surfaces 36 and 37, base surface 38, and rounded corners 36', 37', 36" and 36". Barrier layer 40 can be made from concrete, rock, macadam, fiberglass, synthetic and natural preparations that set into protective surfaces, matting, composite flexible materials, cloth, synthetic sheets and fabrics, and any material that can protect the soil of side surfaces 36 and 37, base surface 38, and rounded corners 36', 37', 36" and 36" to retain the shape of channel 35'. Barrier layer 40 is secured to the soil to protect the underlying ground surface from being ablated or otherwise eroded away by the blast of pressurized air (from air cushions) from air supported vehicles 20 and weather. Grass is not entirely suitable for barrier layer 40 since the air cushions eventually blow sand and other ground particles out from the roots and cause the grass to die, unless the grass is extremely dense.

Figure 2:
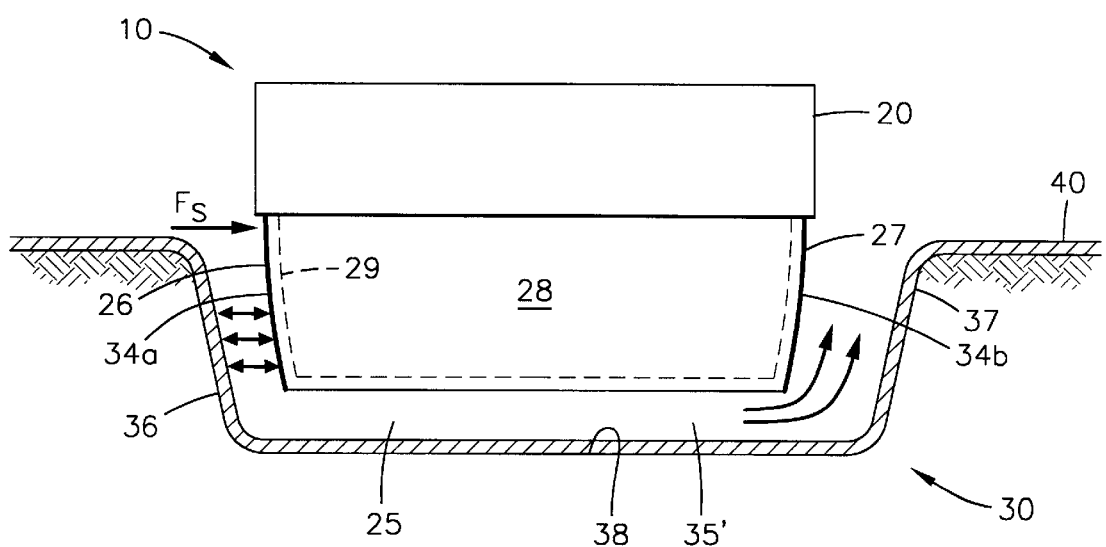
FIG. 2 is an end view of the transportation system of this invention depicting the generation of stabilizing forces for an air-cushion vehicle supported by an air cushion in a U-shaped roadway.

Referring to FIG. 2, flowing pressurized air from air cushion 25 in combination with center-of-gravity loading of vehicle 20 creates reacting pressure forces formed between portions of either side panel 26 or 27 that extend into channel 35' and of either side surface 36 or 37 to directionally stabilize vehicle 20 as it rides along channel 35'. For example, if vehicle 20 becomes unstable and begins to slide off-center to the left as depicted, pressure forces (indicated by the small opposing arrows) act on side surface 36 and side panel 26 to generate a composite side force $F_s$ that pushes vehicle 20 to the right and on-center in channel 35'. The pressure between the greater separated side surface 37 and side panel 27 is less than between side surface 26 and side panel 36, and at least some of the mass of air cushion 25 is being vented between surface 37 and panel 27 as shown by the larger arrows. The amount of this force $F_s$ is enough to center vehicle 20 in channel 35' and is a function of the pressure of air cushion 25 times the side area of side panel 26. This force $F_s$ is exerted on first area 34a which is equal to the length of side panel 26 on vehicle 20 times the length of its extension into the depth of channel 35'. If vehicle 20 becomes unstable and begins to slide off-center to the right, then side surface 37 and side panel 27 produce second area 34b reacting with pressure forces in air cushion 25 to push vehicle 20 to the left on-center in channel 35'. When yaws occur, a combination of these stabilizing forces is generated on fore and aft portions of vehicle 25 to straighten it out. Thus, it is seen that the design and function of U-shaped channel 35' of roadway 30 are markedly different from conventional crowned roads and runways that have inverted U-shapes where air cushion vehicles would otherwise yaw and/or fall off.

Figure 3:
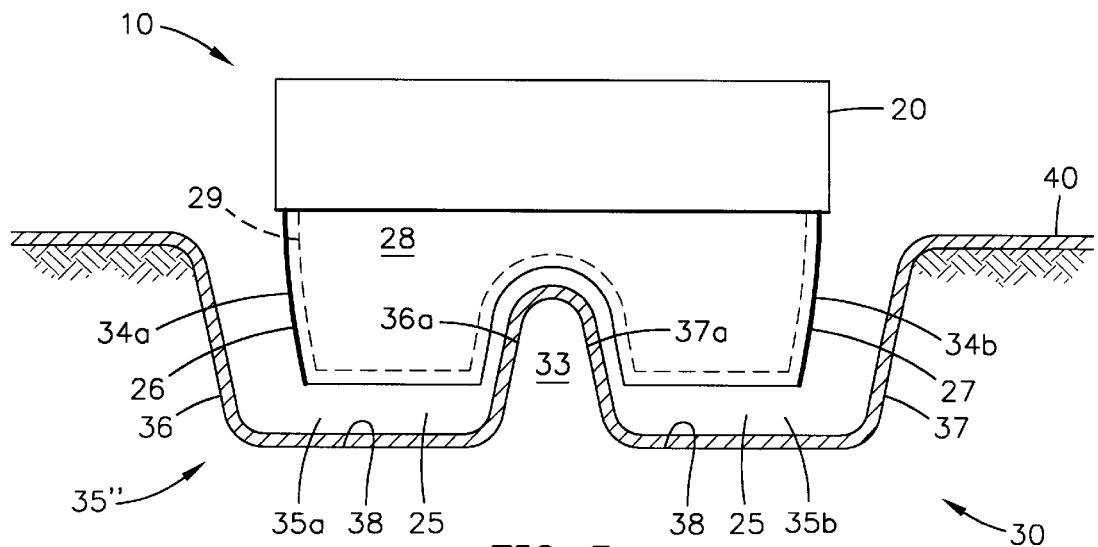
FIG. 3 is an end view of the transportation system of this invention having an air-cushion vehicle supported by an air cushion in a W-shaped roadway.

Referring to FIG. 3, in another embodiment of transportation system 10, roadway 30 has W-shaped channel 35" provided with a pair of elongate trench-like channel portions 35a and 35b. Elongate channel portions 35a and 35b are dug into the earth forming side surfaces 36 and 37 and base surfaces 38, and elongate channels 35a and 35b additionally create raised berm 33 having side surfaces 36a and 37a in the center. This embodiment has front panel 28 and rear panel 29 tailored to accommodate W-shaped channel 35". Barrier layer 40 is applied and secured to surfaces 36, 37, 36a, 37a, and 38 to resist ablation and preserve the W-shape.

Flowing pressurized air from air cushion 25 of vehicle 20 in combination with center-of-gravity loading of vehicle 20 creates reacting pressure forces on first area 34a or second area 34b to directionally stabilize vehicle 20 as it rides in W-shaped channel 35" of roadway 30. When vehicle 20 is unstable, this embodiment generates areas of increased air pressure in first area 34a and second area 34b. Stabilization of vehicle 20 occurs in substantially the same way as the embodiment of FIGS. 1 and 2.

Figure 4:
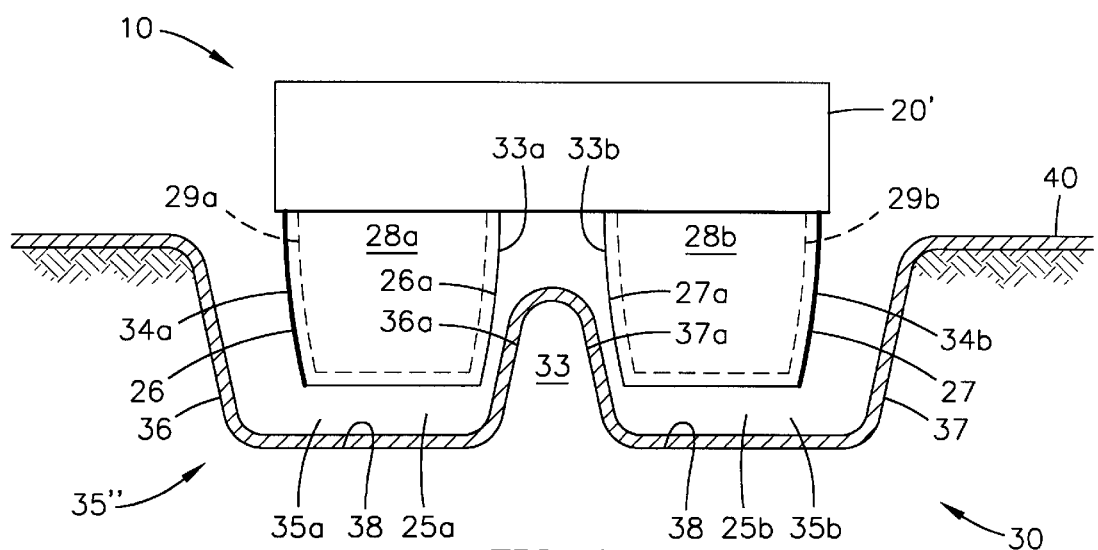
FIG. 4 is an end view of the transportation system of this invention having an air-cushion vehicle supported by two air cushion parts in a W-shaped roadway.

Referring to FIG. 4, air cushion vehicle 20' has its air cushion split into two parts 25a and 25b by intermediate panels 26a and 27a that are between and parallel with panels 26 and 27, and pairs of front panels 28a and 28b and back panels 29a and 29b (or left and right parts of panels 28 and 29). Air cushion part 25a is bounded and defined by side panel 26, front panel 28a, intermediate panel 26a, and back panel 29a, and air cushion part 25b is bounded and defined by side panel 27, front panel 28b, intermediate panel 27a, and back panel 29b. Pressurized air cushion parts 25a and 25b are at virtually the same pressure, and air cushion parts 25a and 25b respectively conform to channel portions 35a and 35b of W-shaped channel 35". Roadway 30 has side surfaces 36 and 37, pair of base surfaces 38, and side surfaces 36a and 37a on opposite sides of berm 33. All of these surfaces are covered by barrier layer 40. Side surfaces 36a and 37a increase or add areas responsive to air pressure forces to the amount of the side areas available for reacting to pressure forces generated by air cushion parts 25a and 25b. These added areas are designated third area 33a and fourth area 33b and are both about equal in size to the height of berm 33 times the length of vehicle 20'. Third area 33a or fourth area 33b is summed with first area 34a or second area 34b to determine the total areas that air pressure forces from air cushion parts 25a or 25b react with to stabilize and maintain stability of vehicle 20'.

If air cushion vehicle 20' becomes unstable and begins to slide off-center to the left, air cushion part 25a creates air pressure forces on first area 34a on side panel 26, and air cushion 25b creates air pressure forces on fourth area 33b on intermediate panel 27a. This set of air pressure forces generates a composite force to move vehicle 20' to the right and center it in W-shaped channel 35". If air cushion vehicle 20' becomes unstable and begins to slide off-center to the right, then air cushion 25b creates air pressure forces on second area 34b on side panel 27, and air cushion 25a creates air pressure forces on third area 33a on intermediate panel 26a. This set of air pressure forces generates a composite force to move vehicle 20' to the left and center it in W-shaped channel 35". When yaws occur, combinations of these sets of air pressures generate stabilizing forces on fore and aft portions of vehicle 20' to straighten it out. The stabilizing forces are produced on first area 34a and second area 34b and third area 33a and fourth area 33b by pressurized air in air cushion parts 25a and 25b and work to counter forces and motions that destabilize vehicle 20'.

Transportation system 10 avoids the possibility of creating problems caused by water and dirt that could collect in the bottoms of U-shaped channel 35' and W-shaped channel 35". Air cushions generated during routine hauling of loads blow this debris free, and the end effect is negligible to successful operations. Additional skirts or deflectors can be added to the sides of the cushion to knock the debris raised by the air cushions toward the ground so that people and property near roadway 30 are not harmed or damaged.

Figure 5:
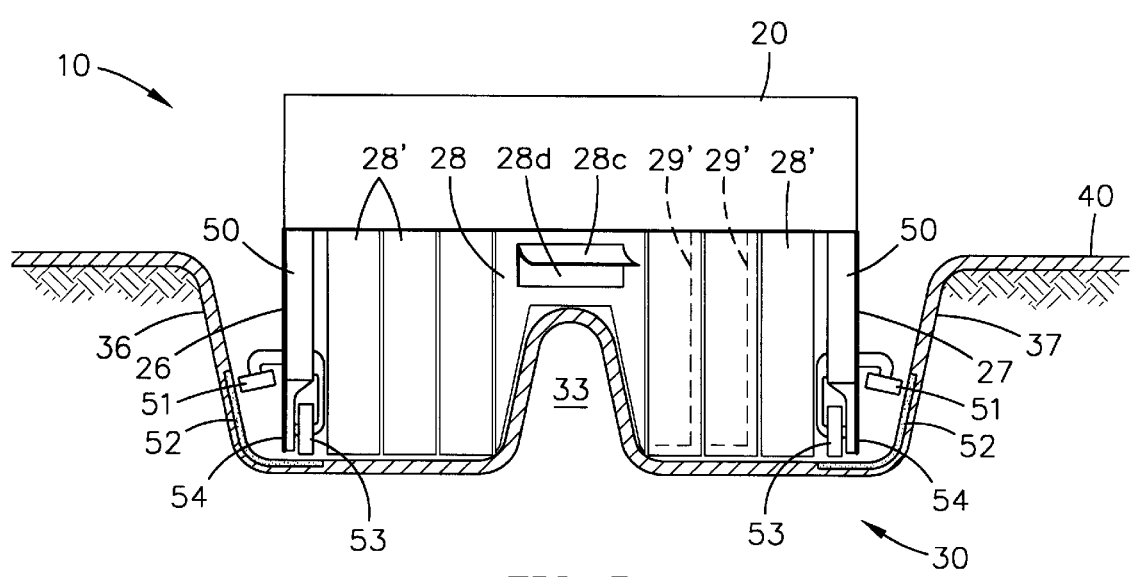
FIG. 5 is an end view of the transportation system of this invention showing additional features of an air-cushion vehicle supported by an air cushion in a W-shaped roadway.

Referring to FIG. 5, transportation system 10 can have rigid sidewalls, or struts 50 adjacent to side panels 26 and 27 that partially or completely extend along the sides of vehicle 20. Sidewalls 50 may be hollow to pass pressurized air in sufficient quantities to lift and support vehicle 20, or the pressurized air fed through sidewalls 50 could be used to augment the air cushion. Sidewalls 50 may have rollers 51 to contact surfaces 36 and 37, and these surfaces may have concrete strips 52 extending along or on the bottom of roadway 30 to prevent damage. In addition, landing wheels or tracked wheels 53 may be provided for support and for propelling vehicle 20 especially when it slows and stops. Suitable friction brakes may be included in rollers 51 and wheels 53 to aid in braking.

Rubber or rigid skids 54 might also be included on sidewalls 50, or sidewalls might be made of hard rubber to provide frictional contact with strips 52 to stop and guide vehicle 20 when the supporting air cushions are reduced. Optionally, skids 54 may be mechanically or hydraulically lowered to contact strips 52. Braking can also be effected by reversing the propulsion system if it is an air mover having, for example, one or more propellers. Another option for braking is to vent a portion of pressurized air from the air cushion through displaceable shrouds 28c over openings 28d in front panels 28. Front and back panels may be made up from numbers of differently sized segments, fingers, or cells 28' and 29' to fit about berm 33 with some of the segments being shorter than others to help centering of vehicle 20 in roadway 30.

Transportation system 10 provides the potential for high-speed, heavy-lift vehicles which can utilize the right-of-ways that may, for example, be currently owned by railroads at lower installation and maintenance costs. The channels may be dug in the ground without any erosion protection or any addition of artificial material so that the ground can return to its natural state more quickly after use. Roadways 30 can be prepared and a high speed heavy-lift transport system 10 can be installed quickly and made operational at low cost with relatively little effort using conventional earth moving equipment.

By standardizing roadways 30, differently sized air cushion vehicles using the ground effect principle can be designed to accommodate different cargo loads. For example, an air cushioned barge structure could be designed to permit standardized container-boxes to be connected to their tops. Thus, the standardized containers could be lifted directly from ships, placed onto ground effect platforms, and transported to another area where the containers are lifted onto a trailer and transported directly to the destination without ever having to unload the contents or transfer them from one container to another. Tanks of liquids or hot or cold commodities could be transported equally as well. The advantages are that the goods could be quickly changed from one mode of transportation to another and trains could be replaced.

Many railroads have extensive overland right-of-ways that are underutilized. These right-of-ways could be converted into the alternative, less expensive transportation system 10, and the cost of distribution of goods and equipments could be reduced to lower the life cycle cost of all equipments. The real estate investment represented by these right-of-ways could be inexpensively adapted to transportation system 10 that is capable of higher transit speed, lower capital investment, and lower maintenance costs, so that the entire infrastructure of transportation system 10 would benefit.

Having the teachings of this invention in mind, modifications and alternate embodiments of this invention may be adapted. For examples, the cross-sectional shape of berm 33 could be altered and covered with a host different barriers 40 so long as the altered configuration serves to support, guide, and stabilize air cushion vehicles; berm 33 while disclosed as being rigid earth or compacted soil could also be a rigid guide rail or raised guide rail that vertically rises above and extends along the ground; air cushion vehicles 20 could be differently sized, such as by having overhanging deck spaces to accommodate different loads; or several modified vehicles 20 could be coupled together in train-like fashion and towed or pushed by a similar tractor-like vehicle 20; and lighter, stronger fabrication materials and more powerful air pressure and volume equipments also could be included to bear increased loads without departing from this invention.

The disclosed components and their arrangements as disclosed herein all contribute to the novel features of this invention. This invention provides cost-effective and quickly built means to rapidly transport heavy loads. Therefore, transportation system 10, as disclosed herein is not to be construed as limiting, but rather, is intended to be demonstrative of this inventive concept.

It should be readily understood that many modifications and variations of the present invention are possible within the purview of the claimed invention. It is to be understood that within the scope of the appended claims the invention may be practiced otherwise than as specifically described.

I claim:

1. A transportation system comprising:
    an air cushion vehicle in a channel in the ground to provide support and directional stability for said air cushion vehicle during transit therein;
    a barrier layer covering surfaces of said channel to prevent ablation of said ground by pressurized air from an air cushion;
    panels on the periphery of said vehicle disposed in said channel, said channel being a W-shaped channel, said panels including left and right side panels on opposite lateral sides of said vehicle and extending its length and a portion of the depth of said W-shaped channel and front and rear panels extending across the width of said vehicle and a portion of the width of said W-shaped channel, said panels further including two intermediate panels between said left and right side panels extending parallel therewith for the length of said vehicle and a portion of the depth of said W-shaped channel, and said front panel having a left part and a right part adjacent one another to extend across the width of said vehicle and said back panel having a left part and a right part adjacent one another to extend across the width of said vehicle, said left side panel, one of said intermediate panels, said left part of said front panel, and said left part of said rear panel bounding and defining first air cushion part of said air cushion, and said right side panel, the other of said intermediate panels, said right part of said front panel, and said right part of said rear panel bounding and defining second air cushion part of said air cushion, said first air cushion part and second air cushion part are each disposed in a separate elongate channel portion of said W-shaped channel.

2. A system according to claim 1 in which said first air cushion part and second air cushion part each generates forces to stabilize said vehicle as it transits said W-shaped channel.

3. A transportation system comprising:
    an air cushion vehicle in a channel in the ground to provide support and directional stability for said air cushion vehicle during transit therein;
    a barrier layer covering surfaces of said channel to prevent ablation of said ground by pressurized air from an air cushion;
    panels on the periphery of said vehicle disposed in said channel, said channel being a W-shaped channel, said panels including left and right side panels on opposite lateral sides of said vehicle and extending its length and a portion of the depth of said W-shaped channel and front and rear panels each extending across the width of said vehicle and a portion of the width of said W-shaped channel, said panels further including two intermediate panels between said left and right side panels extending parallel therewith for the length of said vehicle and a portion of the depth of said W-shaped channel, and said front panel having a left part and a right part adjacent one another to extend across the width of said vehicle and said back panel having a left part and a right part adjacent one another to extend across the width of said vehicle, said left side panel, one of said intermediate panels, said left part of said front panel, and said left part of said rear panel bounding and defining first air cushion part of said air cushion, and said right side panel, the other of said intermediate panels, said right part of said front panel, and said right part of said rear panel bounding and defining second air cushion part of said air cushion, said first air cushion part and second air cushion part being disposed in a separate elongate channel portion of said W-shaped channel, said first air cushion part and second air cushion part each generating forces to stabilize said vehicle as it transits said W-shaped channel; and
    a skid and wheel on each of rigid sidewalls on opposite sides of said vehicle to contact said W-shaped channel for stability and braking.

4. A system according to claim 3 further comprising:
    elongate concrete strips in said W-shaped channel to resist abrasion from said skids and wheels.

\* \* \* \* \*